May 17, 1955 — D. R. DRAPER — 2,708,635
METHOD OF PROCESSING MEAT PRODUCTS
Filed July 12, 1951
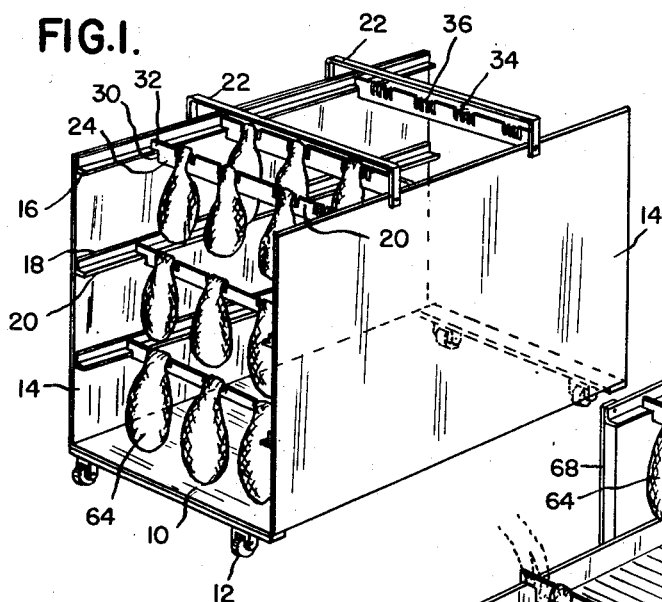
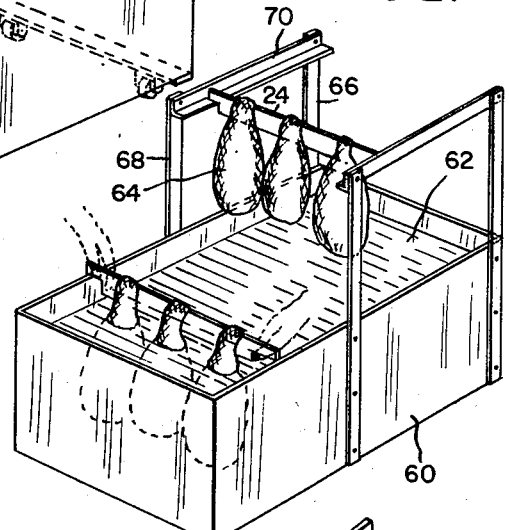
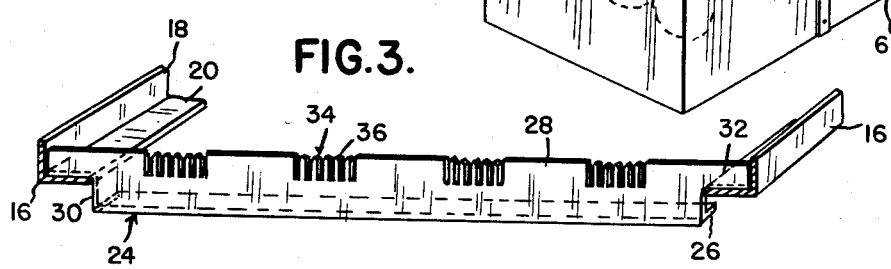
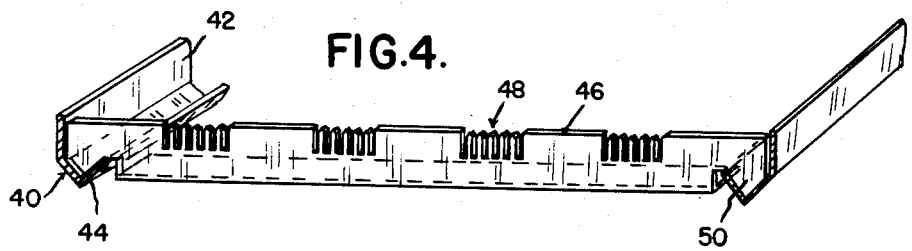
INVENTOR.
DONALD R. DRAPER
BY Whittemore,
Hulbert & Belknap
ATTORNEYS United States Patent Office 2,708,635
Patented May 17, 1955

2,708,635

METHOD OF PROCESSING MEAT PRODUCTS

Donald R. Draper, Detroit, Mich.

Application July 12, 1951, Serial No. 236,412

4 Claims. (Cl. 99—169)

The present invention relates to method and apparatus for processing frozen foods.

The present application is a continuation-in-part of my prior copending application, Serial No. 230,777 filed June 9, 1951, now abandoned.

In my prior application Serial No. 13,737, now abandoned, I have disclosed the processing of frozen food and more particularly, the enveloping of articles of food in a fabric such for example as stockinet, freezing the food, after which the frozen food article is dipped into a sealing compound such for example as wax. The wax is quickly congealed around the frozen article and forms a seal about the article of food and prevents loss of moisture, minimizes the tendency for the food to turn rancid, and otherwise operates to permit the frozen food to be retained in frozen condition for extended periods of time.

In my prior copending application Serial No. 96,277, Patent Number 2,665,043 issued on January 5, 1954, I have disclosed method and apparatus for expediting the enclosure of articles of food in fabric which comprises providing means for extending a continuous stockinet material or the like, to facilitate drawing the material over articles of food.

The present invention relates to method and apparatus for handling the articles of food subsequent to enveloping in fabric during the freezing and dipping in the sealing material. Briefly described, the present invention comprises an apparatus and the method of using the apparatus for facilitating the transfer of food articles from the enveloping station to the freezing and dipping station and expediting and rendering more efficient the dipping and draining operation.

It is an object of the present invention to provide method and apparatus for carrying out the transfer of wrapped food articles from a wrapping station and for facilitating the freezing and dipping and draining operation.

More specifically, it is an object of the present invention to provide a transfer truck having a plurality of removable bars thereon, each of which is provided with a plurality of article suspending means such as hooks or upwardly projecting teeth.

It is a further object of the present invention to provide a transfer truck provided with spaced parallel rails for receiving a plurality of bars of the type referred to and a dipping vat having a similar set of spaced parallel bars, the arrangement being such that the bars loaded with food articles may conveniently be transferred from a primary processing station to a dipping station and thereafter the bars may be removed individually from the truck and a plurality of articles suspended from a single bar may be dipped simultaneously into liquid sealing material, after which the bar may be positioned on the spaced rails carried by the vat to permit excess sealing material to drain back into the vat.

It is a further object of the present invention to provide apparatus of the character described in which the rails and bars are provided with interfitting means at the ends of the bars and extending along the rails to permit movement of the bar longitudinally of the rails while avoiding danger of separation between the parts.

It is a further object of the present invention to process food by first enveloping the food product, particularly meat, in a loosely woven open fabric having substantially no heat insulating properties, such as stockinet, thereafter quick freezing the food product, and finally, dipping the frozen food product enveloped in the open weave fabric in a liquid sealing material such as wax, which is adapted to congeal substantially instantly upon the frozen food product and to be reinforced by the fabric.

Other objects and features of the invention will become apparent as the description proceeds, especially when taken in conjunction with the accompanying drawings, wherein:

Figure 1 is a perspective view of a transfer truck.

Figure 2 is a perspective view of the dipping vat.

Figure 3 is a fragmentary perspective view partly in section, showing details of a preferred form of bar and its cooperation with the rails.

Figure 4 is a view similar to Figure 3, illustrating a modified form of bar and rails.

Referring now to Figure 1 there is illustrated a transfer truck having a floor 10 supported by casters 12 and provided with side plates 14. The side plates 14 are provided at their inner surface with rail members 16 arranged in vertically spaced pairs, the rails 16 being illustrated as being formed by angular bars having vertically extending flanges 18 secured to the inner surface of the side panel 14 of the truck and inwardly extending flanges 20. Transverse struts 22 are provided across the top of the side panels 14 to render these parts rigid.

Mounted for movement longitudinally of the rails 16 are bars 24. Referring now to Figure 3, one of the bars is illustrated in enlarged detail. The bar 24 as herein shown is formed of an angle bar having a horizontal flange 26 and a vertical flange 28. At the ends of the bar 24 the horizontal flange 26 and a portion of the vertical flange 28 are cut away as indicated at 30 leaving supporting flanges 32 adapted to rest upon the horizontal flanges 20 of the rails 16.

In order to support food articles on the bars 24 a plurality of article supporting means are provided spaced longitudinally of the bars 24. As illustrated in Figure 3, these means comprise comb sections 34 formed to provide a plurality of upwardly extending fabric engaging fingers 36. Obviously, other types of article supporting means could be provided. However, the particular article supporting means illustrated is of improved utility for the purpose set forth. The stockinet material in which the articles of food are enveloped is intended primarily in use to reinforce the wax-like sealing material subsequently provided. Accordingly, the stockinet material need not be particularly strong. By providing article supporting means including a plurality of teeth engageable in the stockinet material at a corresponding plurality of points, the likelihood of tearing the fabric due to the weight of the suspended article is eliminated.

In Figure 4 there is illustrated a modified construction in which rails 40 are provided comprising vertically extending flanges 42 and V-shaped inwardly extending lower sections 44. The bar 46 is provided with multiple-tooth comb sections 48 identical with the comb sections 34 of the modification illustrated in Figure 3. However, the ends of the bar 46 are provided with downwardly extending pointed projections 50 fitting within the upwardly open V-shaped troughs of the rails 40. The cooperation between the downwardly extending projections 50 of the bars and the upwardly open V-shaped troughs of the rails 40 is readily apparent and will tend to keep the bar extending perpendicularly between the rails so as to prevent accidental separation between the ends of the bars and the rails.

Alternately, other means may be provided for effecting engagement between the ends of the bars and the rails, such for example as rollers at the ends of the bars.

Referring now to Figure 2 there is illustrated a vat 60 containing a quantity of sealing liquid 62 into which the frozen food articles 64 enveloped in stockinet are to be dipped. At the rear portion of the vat are provided posts 66 and 68 between which extend rails 70 which are illustrated as identical with the rails 16 illustrated in Figures 1 and 3. The bars 24 when removed from the rail 16 of the truck are employed by the operator in immersing the articles of food into the liquid 62 as diagrammatically illustrated in Figure 2. After the articles have been immersed in the liquid they are elevated by the bar 24, the ends of which are then placed upon the rails 70 to permit drainage of surplus liquid from the articles of food.

Obviously, if the ends of the bars are shaped as indicated in Figure 4, then the rails provided on the vat will be of corresponding construction.

By the present invention it is possible for a single operator to greatly increase his production of completely processed food articles. Processing includes providing the fabric over the food articles, suspending the wrapped articles on the bars carried by the truck, moving the truck to a freezing compartment, freezing the food, transporting the truck to adjacent the vat, removing the bars one by one and immersing the food articles carried thereby in the sealing liquid, and finally placing the bars on the rails provided above the vat to permit drainage of excess liquid from the food articles back into the vat.

The method disclosed herein offers material advantages over prior known methods, particularly as applied to the processing of meat products. In accordance with the present invention the meat product is frozen prior to wrapping or enclosure in any enveloping heat insulating material. As a result heat transfer is facilitated and I have found that the meat products pass through the freezing stage in substantially half the time as compared to the time required if the meat product is wrapped in paper according to prior known processes, before freezing.

Thus, the present invention comprises the step of enveloping the frozen food product in a reinforcing fabric such as stockinet, after which the food product is frozen and then is immersed in liquid wax. Due to the extremely cold condition of the food product a coating of wax freezes substantially instantly about the frozen food product and is reinforced by the stockinet or other fabric. Moreover, if the food product is irregular in shape so that the stockinet is spaced from portions of the food product, the wax freely penetrates through the stockinet and forms a sealing coating directly against the surface of the food product. Where the stockinet contacts the surface of the food product, it constitutes an integral reinforcing medium within the wax coating. Where the stockinet is spaced from the surface of the food product due to irregularities thereof, it nevertheless constitutes a protective agent overlying the layer of wax which will form directly against the surface of the food product.

While as described in the foregoing, the complete method of processing comprises the first step of enveloping the fresh meat product in an open weave fabric, thereafter freezing the meat product, and finally dipping the food product in liquid wax, it will be appreciated that many of the advantages of the present invention may be retained if the sequence of steps is slightly altered. Thus for example, the meat product may be frozen prior to its envelopment in the stockinet or other open weave fabric. This has a slight theoretical advantage in that the entire surface of the meat is exposed directly to the freezing atmosphere. However, it is found that stockinet or an equivalent fabric has substantially no heat insulating properties and that accordingly the meat will freeze substantially as quickly if enveloped in stockinet as otherwise. On the other hand, the step of enveloping the fresh meat product in stockinet prior to freezing has the advantage that it facilitates transfer of the meat product from the enveloping station to the freezing compartment and thence to the dipping vat. Accordingly, the preferred sequence of steps, as stated above, is to envelop the meat product in stockinet, then to freeze the product, and finally to dip the frozen product in liquid wax.

Food processed in accordance with the present invention retains its fresh color to a surprising degree and moreover, is capable of being stored for extremely long intervals. By way of example, pork products processed in accordance with the present invention have remained in perfect condition for periods in excess of one year, which is of course several times longer than such products may be stored when processed according to prior known methods.

The drawings and the foregoing specification constitute a description of the improved method and apparatus for processing frozen foods in such full, clear, concise and exact terms as to enable any person skilled in the art to practice the invention, the scope of which is indicated by the appended claims.

What I claim as my invention is:

1. A method of processing meat products which comprises enveloping the product in an open weave fabric characterized by having substantially no heat insulating properties, thereafter subjecting the meat product to a low temperature to effect quick freezing thereof, and finally dipping the frozen meat product in liquid wax thereby forming a coating of congealed wax which is reinforced and protected by the open weave fabric.

2. A method as defined in claim 1 in which the open weave fabric is stockinet.

3. The method of processing meat products which comprises quickly freezing the meat product while the surfaces thereof are exposed substantially directly to the cold air of a freezing compartment, thereafter enveloping the frozen meat product in an open weave fabric, and finally dipping the frozen enveloped meat product into liquid wax.

4. The method of processing meat products which comprises the step of quickly freezing the meat products while their surfaces are substantially directly exposed to cold air in a freezing compartment, the step of thereafter dipping the frozen meat products into liquid wax thereby forming a congealed protective wax coating thereon, and the step of enveloping the meat products in an open weave protective fabric prior to dipping the frozen products in liquid wax.

References Cited in the file of this patent

UNITED STATES PATENTS

| | | |
|---|---|---|
| Re. 10,560 | Sternberg | Feb. 10, 1885 |
| 197,314 | Bate | Nov. 20, 1877 |
| 241,492 | Howell | May 17, 1881 |
| 256,084 | Warner | Apr. 4, 1882 |
| 260,450 | Cahoone | July 4, 1882 |
| 843,300 | Remmers | Feb. 5, 1907 |
| 1,367,672 | Smith | Feb. 8, 1921 |
| 1,691,621 | Young | Nov. 13, 1928 |
| 1,943,023 | Langenkamp et al. | Jan. 9, 1934 |
| 2,214,153 | Williams et al. | Sept. 10, 1940 |
| 2,329,472 | Koonz | Sept. 14, 1943 |
| 2,337,645 | Cadwell | Dec. 28, 1943 |
| 2,337,666 | Koonz et al. | Dec. 28, 1943 |
| 2,341,198 | Weiskopf | Feb. 8, 1944 |
| 2,386,079 | Weiskopf | Oct. 2, 1945 |
| 2,488,535 | Hamburg | Nov. 22, 1949 |

FOREIGN PATENTS

| | | |
|---|---|---|
| 229,036 | Great Britain | Feb. 19, 1925 |
| 8,714/32 | Australia | Aug. 7, 1933 |